J. F. GAIL.
MACHINE FOR BUFFING BEDSTEAD MOUNTS AND THE LIKE.
APPLICATION FILED JULY 27, 1908.
928,254.
Patented July 20, 1909.
9 SHEETS—SHEET 6.
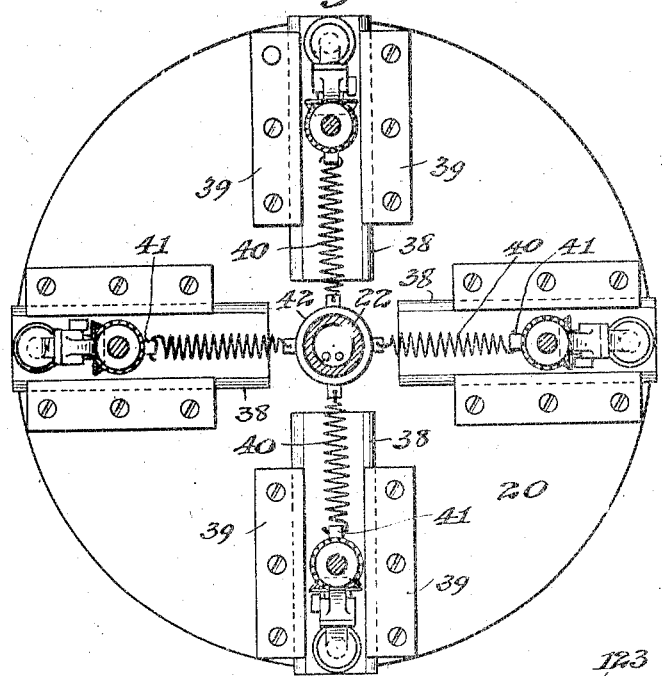
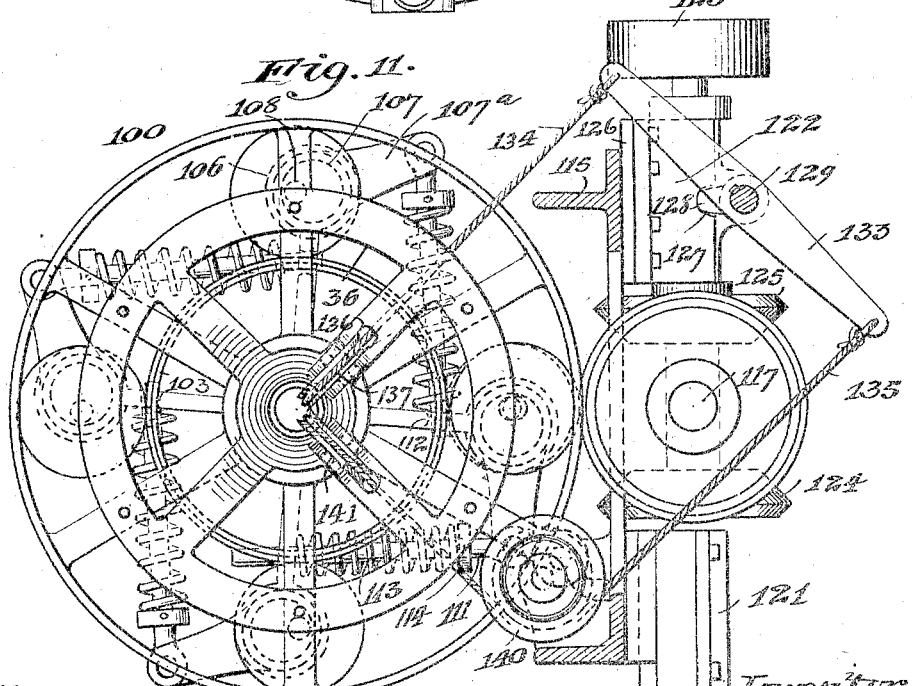

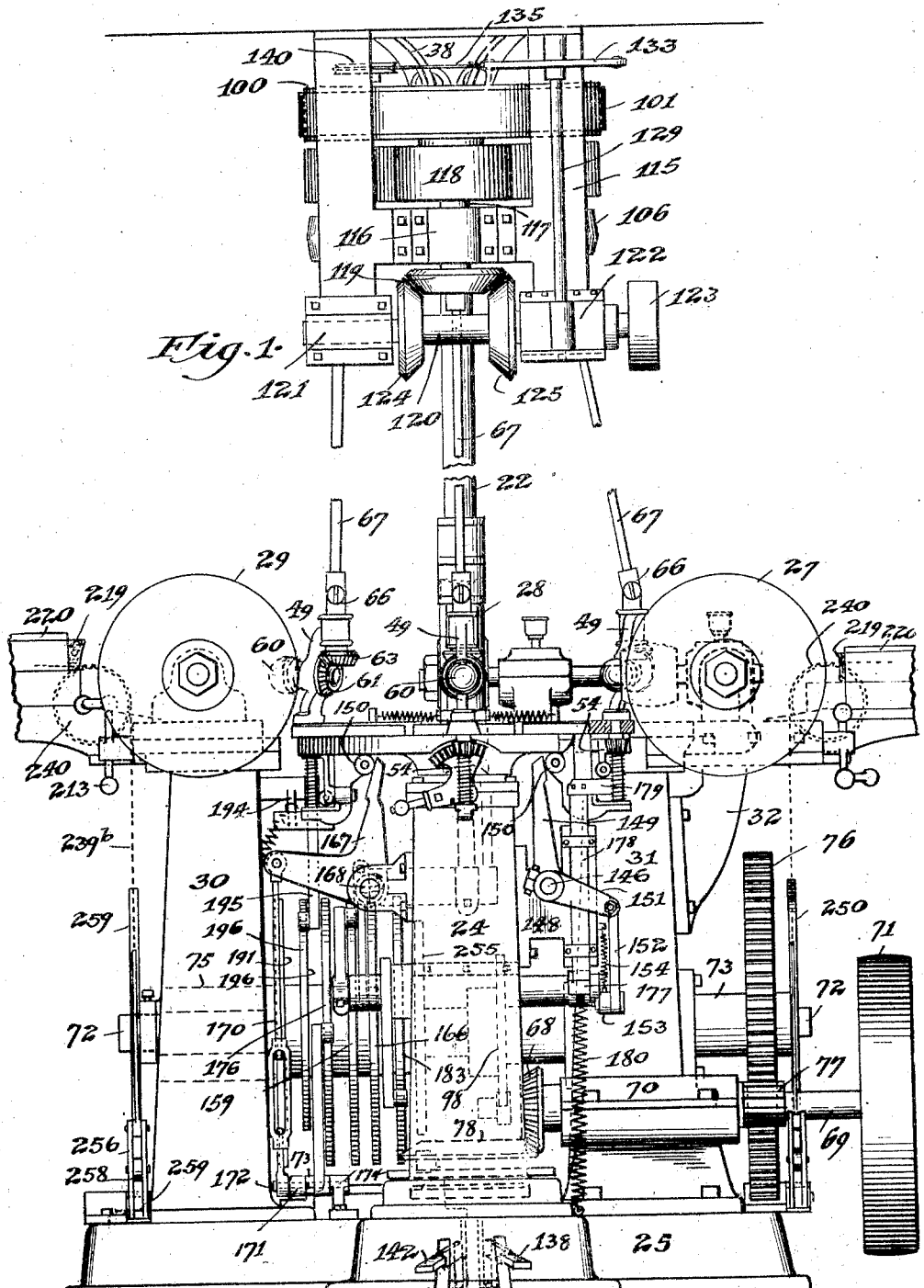

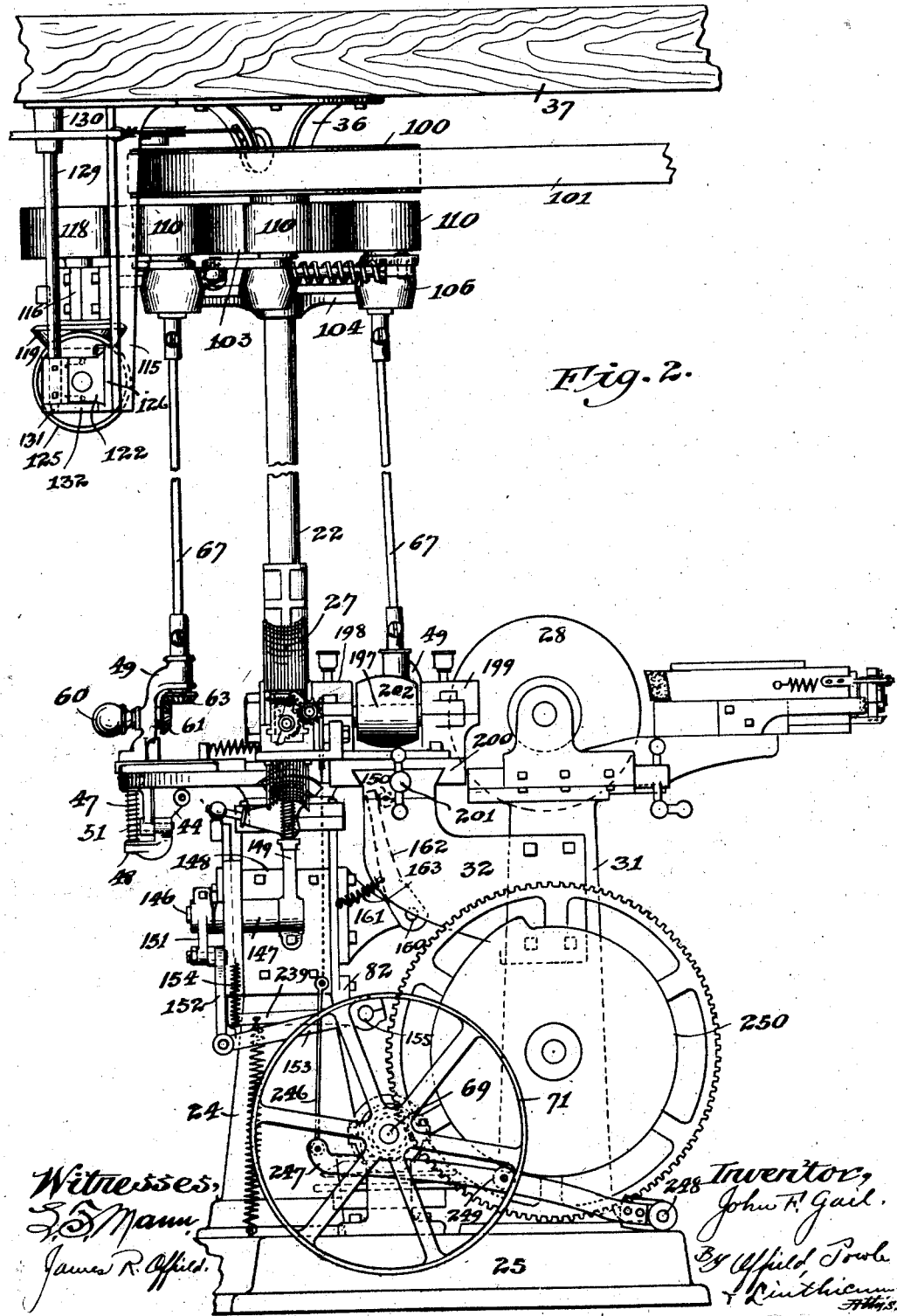

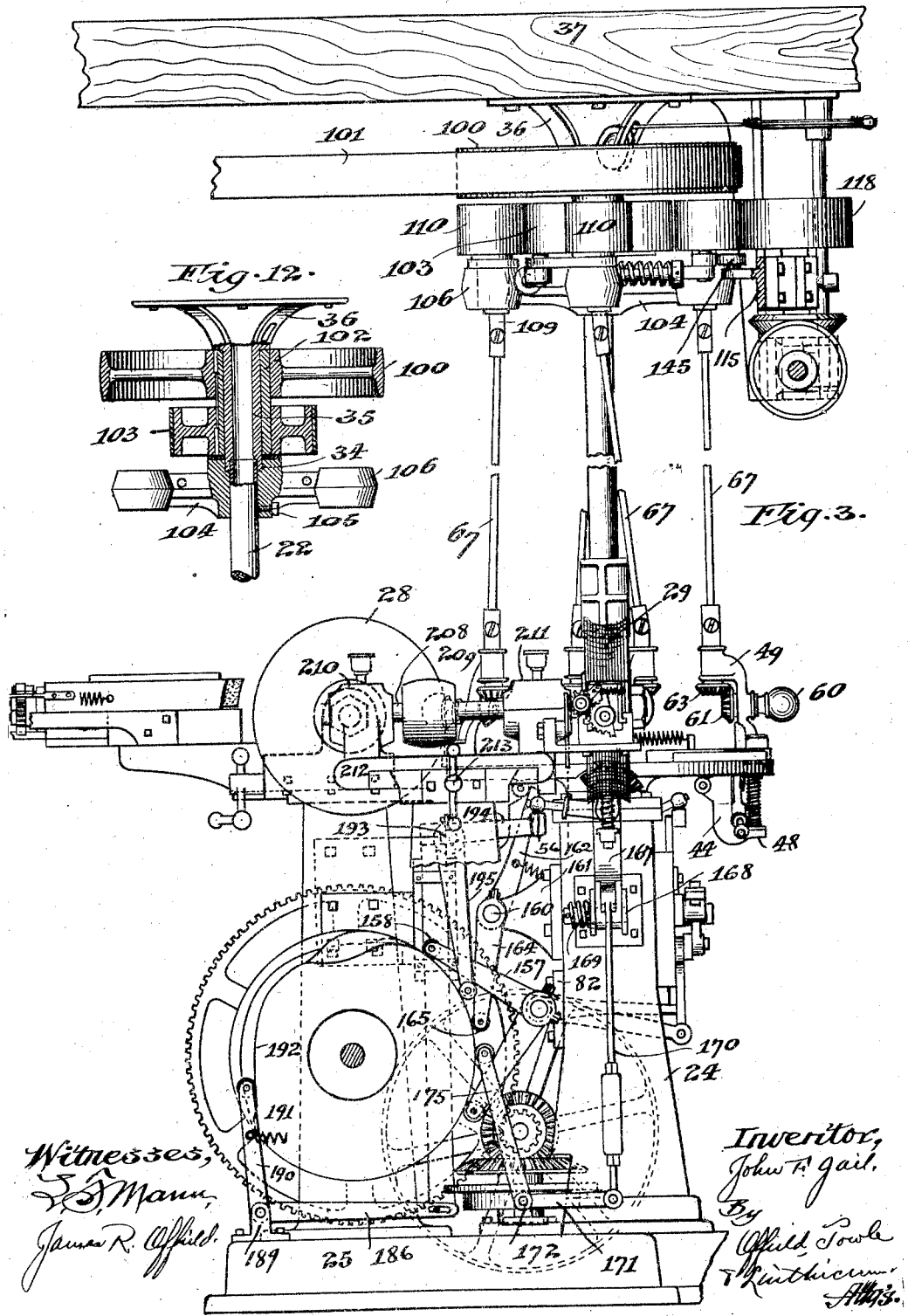

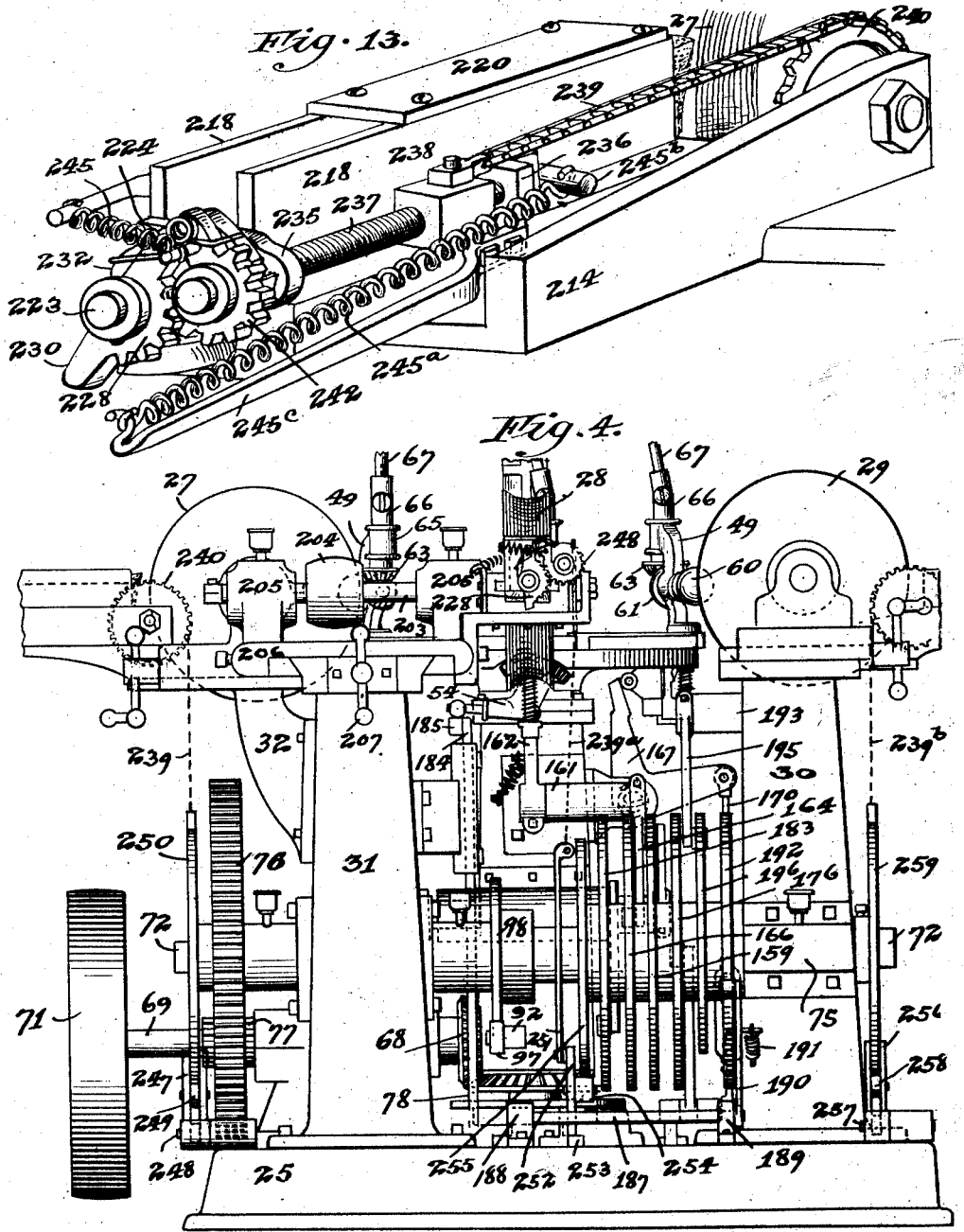

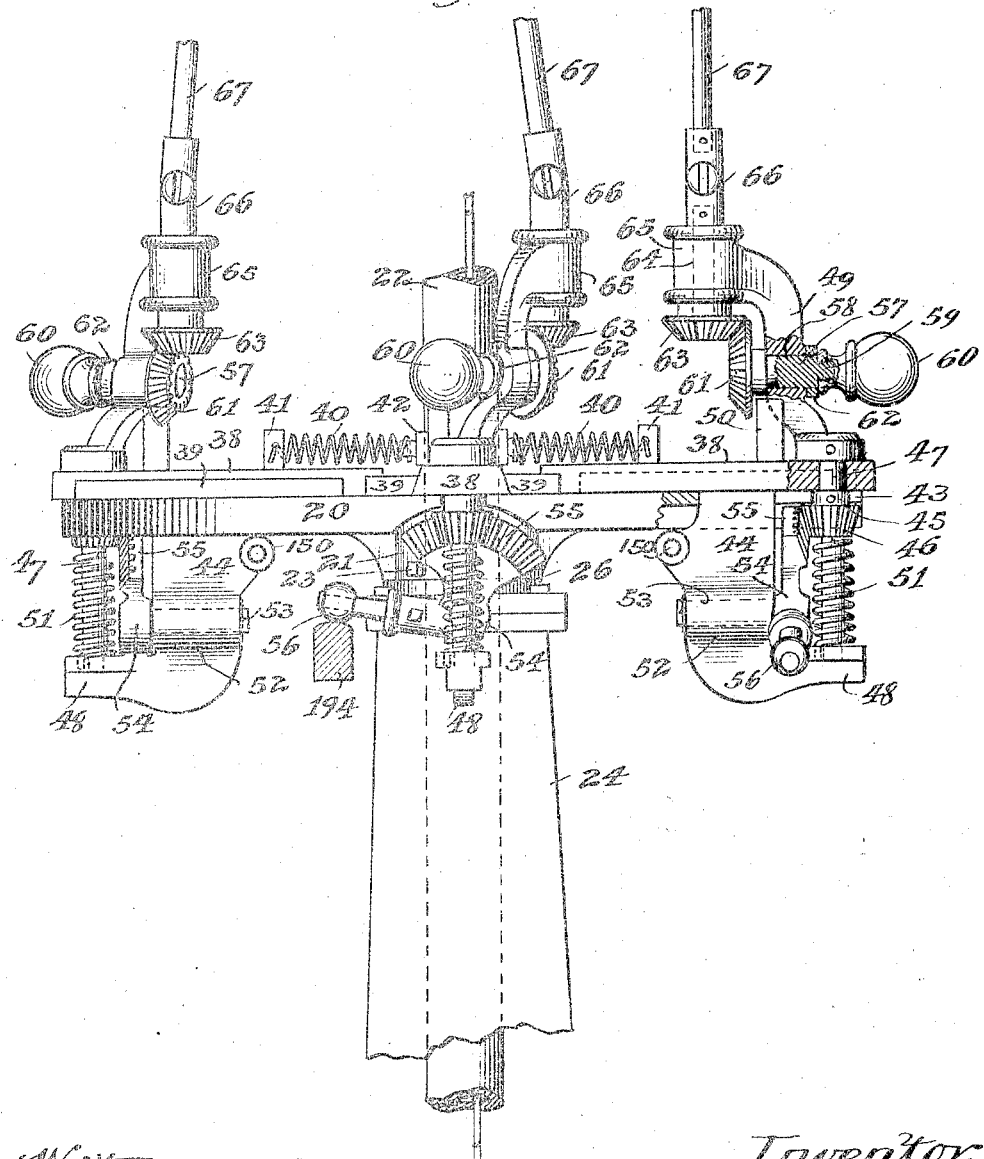

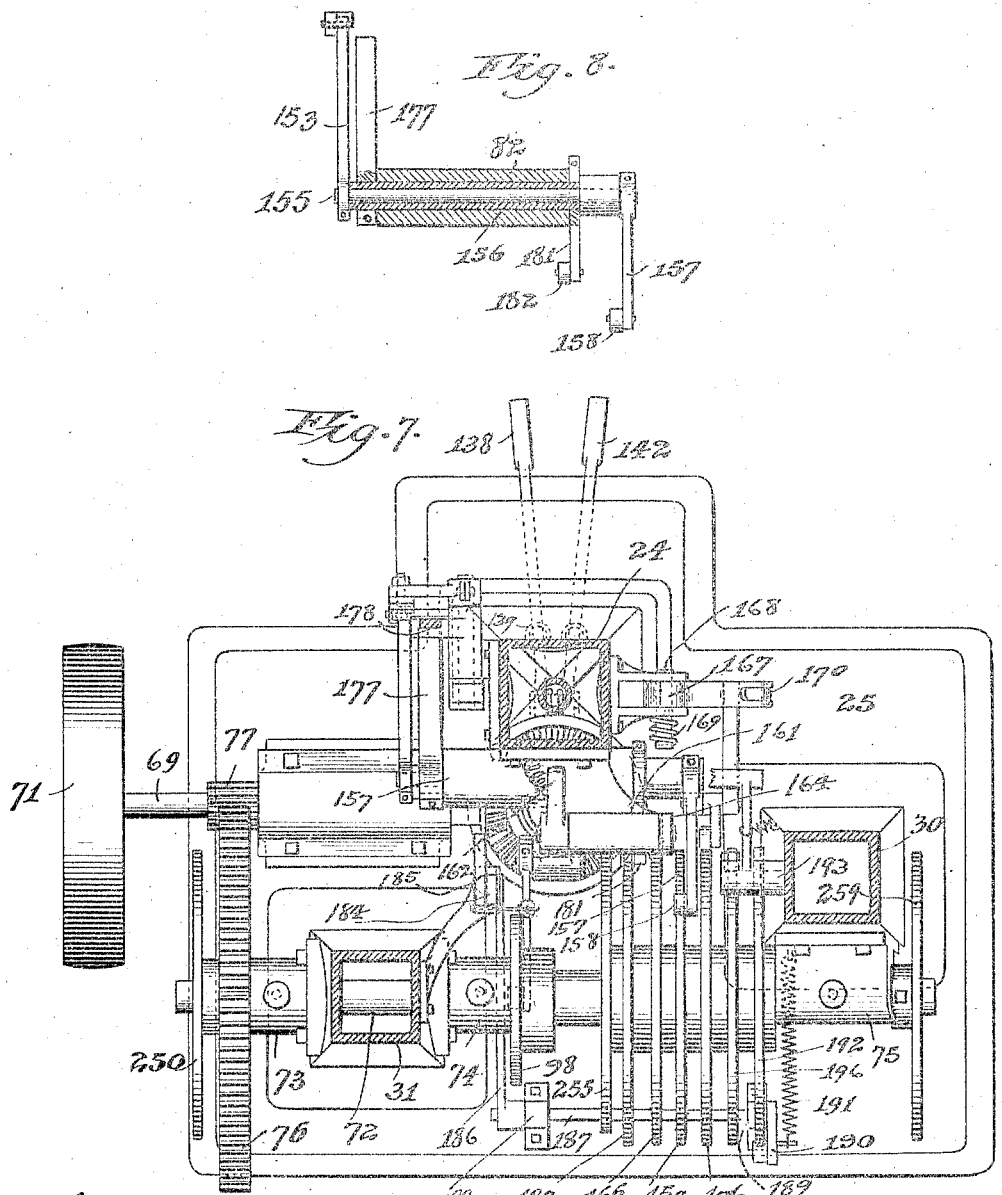

J. F. GAIL.
MACHINE FOR BUFFING BEDSTEAD MOUNTS AND THE LIKE.
APPLICATION FILED JULY 27, 1908.
928,254.  Patented July 20, 1909.
9 SHEETS—SHEET 8.
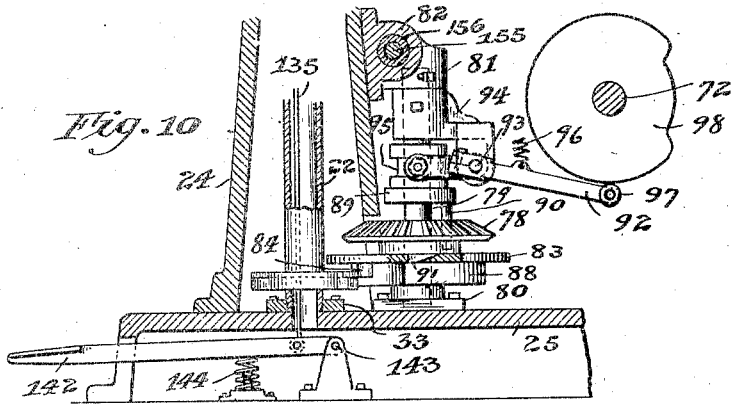
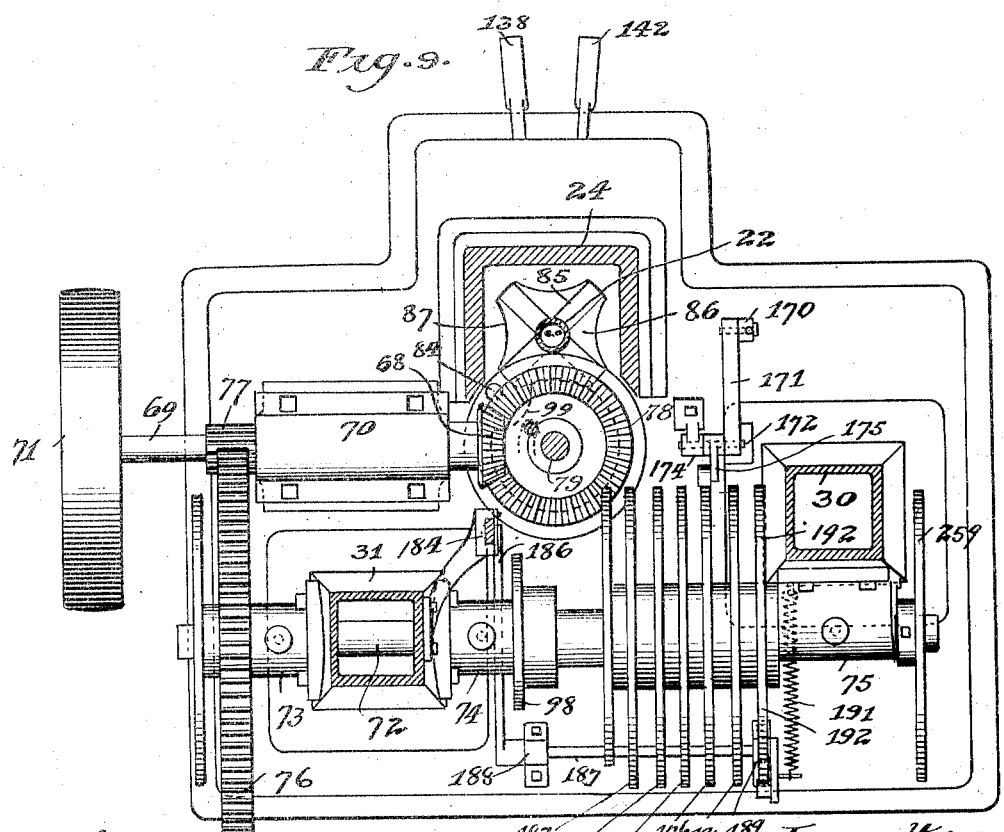

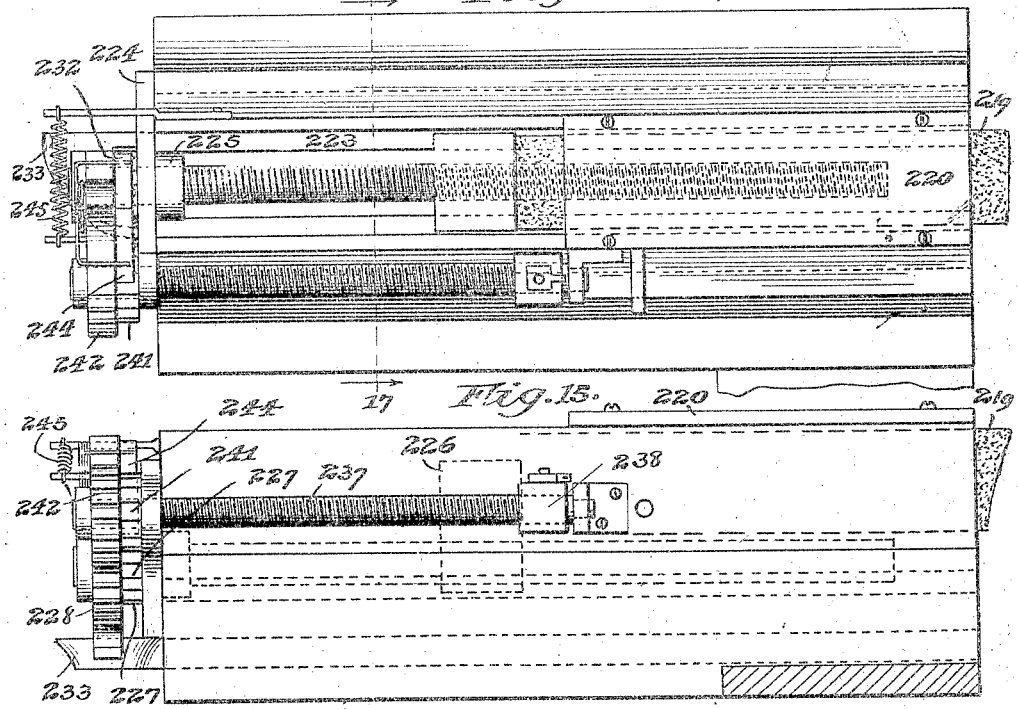
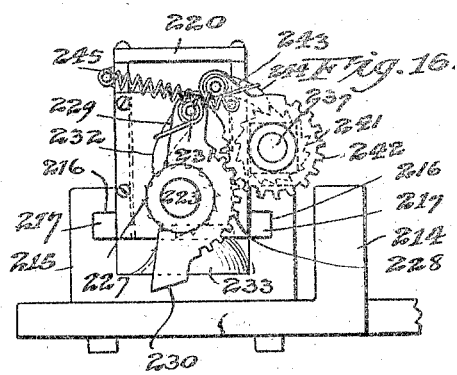
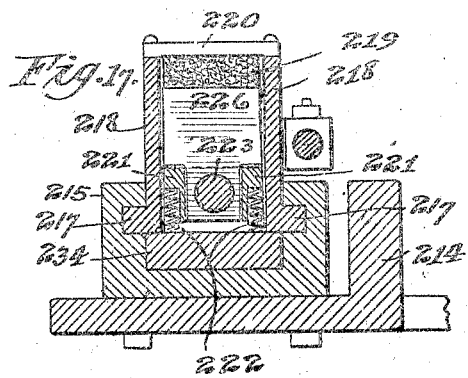

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

MACHINE FOR BUFFING BEDSTEAD-MOUNTS AND THE LIKE.

No. 928,254.      Specification of Letters Patent.      Patented July 20, 1909.

Application filed July 27, 1908. Serial No. 445,637.

*To all whom it may concern:*

Be it known that I, JOHN F. GAIL, a citizen of the United States, residing at Kenosha, in the county of Kenosha and State of Wisconsin, have invented certain new and useful Improvements in Machines for Buffing Bedstead-Mounts and the Like, of which the following is a specification.

My invention concerns machines for buffing or burnishing metal or other pieces such, for example, as the knobs or mounts of brass bedsteads, and aims to provide a mechanism of this character which will be largely automatic in its action and which will smooth and polish all exterior parts of the knob or mount, buffing each portion of the same the required amount to produce a finished article with an outer surface of uniform smoothness and polish.

In the preferred embodiment of my invention a number of buffing wheels are arranged around a central table which carries the knobs successively into position to be acted upon by each of the wheels, which may, if desired, be of different kinds or supplied with abradants or polishing materials of different grades or character. The knobs or mounts are not only rotated on their own axes, but are also swung around other axes while being burnished, this swinging or turning being desirably controlled by cams or their equivalents. I also equip the machine with means for automatically and periodically applying abradant or polishing material to the buffer wheels, each of such devices acting to feed the abradant forward as it is worn off by its successive contacts with the periphery of the wheel, the travel of the carriage or support for the abradant or polishing material being automatically varied or regulated to compensate for the wearing down of the buffer wheel. In addition I employ means operated by the foot of the workman for facilitating the removal of the finished mounts or knobs and the placing in position of other pieces to be buffed or burnished. A convenient means for this purpose provides for the foot control of reverse rotation of the threaded supports or shafts on which the knobs are mounted, whereby the workman is enabled to grasp the finished polished knob, cause the rotation of the shaft in one direction to free the knob therefrom, and then facilitate the screwing on of the new or unpolished knob by reversing the direction of shaft rotation.

Many features of novelty and improvement will be made apparent from the following detailed description of one embodiment of the invention, taken in connection with the accompanying drawings, forming a part of this specification, to which reference should be made, and whereon like reference characters refer to the same parts throughout the various views.

On the drawings—Figure 1 is a front elevation of the machine, the several long substantially-upright shafts having sections broken out; Fig. 2 is an elevation of the right-hand end of the machine as viewed in Fig. 1, with parts omitted; Fig. 3 is an elevation of the left-hand end of the machine as viewed in Fig. 1, with parts omitted for the sake of clearness; Fig. 4 is a rear elevation of the lower portion of the machine, certain parts being omitted; Fig. 5 is a fragmentary elevation, certain parts being in section, of the central rotary table and the knob-supporting and rotating means carried thereby; Fig. 6 is a plan view of this central table, the various vertical shafts being shown in section; Fig. 7 is a horizontal section through the machine below the central table; Fig. 8 is a detailed section illustrating the mounting of one of the rock shafts; Fig. 9 is a horizontal section through the machine below the table, certain parts being omitted for the sake of clearness; Fig. 10 is a fragmentary vertical central section through the base of the machine and a portion of the main front upright standard; Fig. 11 is a plan view, partially in section, of the portion of the machine secured to the overhead beams; Fig. 12 is a central section of the main portion of this overhead driving mechanism; Fig. 13 is a perspective view of one of the abradant feeding and adjusting devices; Fig. 14 is a plan view of one of these abradant controlling mechanisms, the spring retracting means being omitted; Fig. 15 is a side elevation of the construction illustrated in Fig. 14; Fig. 16 is an end elevation of the mechanism shown in Figs. 14 and 15; and Fig. 17 is a cross-section on line 17—17 of Fig. 14.

Referring to the drawings, it will be noticed that a round, centrally-disposed, rotary work table 20 has on its under surface a depending, axially-apertured hub 21 (Fig. 5) fixed to a central, vertical, hollow shaft 22, passed therethrough, by means of one or more set-screws 23, the shaft passing vertically through a hollow upright standard or post 24 suitably mounted on the base 25 of the machine. At 26 this hollow hub 21 has a bearing, such as a ball-bearing, (not shown in detail) on the top of the post or standard 24, whereby the latter sustains practically all of the weight of the table and its associated parts. Grouped concentrically around the table 20 and its shaft 22 at 90° apart, I provide a plurality of buffing wheels 27, 28 and 29 mounted on the posts or standards 30 and 31 and a bracket 32 bolted to the latter, these standards, as will be readily understood, rising from and being fastened to the main base 25. The hollow shaft 22 at its lower end (Fig. 10) has a step-bearing 33 on the top of the base 25, while the upper end of the shaft (Fig. 12) has a bearing 34 in the lower end of a stationary bushing or hollow shaft 35, depending from a supporting bracket 36 secured by bolts or other means to an overhead support 37. Four slides or blocks 38, radially reciprocatory on the round table 20 and arranged 90° apart, are guided in their sliding movements by the oppositely-disposed guiding bars 39, the slides or blocks 38 being pulled inwardly toward the central hollow shaft 22 by a plurality of expansion springs 40, the outer end of each of which is fastened to its corresponding slide or block at 41, while the inner ends of all of the springs 40 are secured to a collar 42 encircling the shaft 22. Beneath each of these slides the table 20 is radially slotted at 43 (Fig. 5) for the accommodation of a bracket or arm 44 depending from each of the slides, the slots also accommodating and permitting the radial movement of the hubs 45 of small bevel gears 46 pinned to vertical shafts 47 each having a bearing at its upper end in one of the slides 38 and another bearing at its lower end in the upwardly-extended portion 48 of the depending arm or bracket 44. Secured to the upper end of each of these shafts 47 I fasten a right-angle bracket 49 normally swung around against a stop 50 rising from the top of the corresponding slide or block 38 by a torsion spring 51 encircling the shaft 47 below the pinion 46, and having one end fixed to the shaft while its other end is secured to the outwardly-extended finger or bearing portion 48 of the bracket 44.

Journaled in a bearing 52 and radially disposed with relation to the axis of the table 20 and central shaft 22, I provide a free shaft 53 in each of the brackets 44, each shaft 53 having secured to its outer end a right-angled member 54 having on one of its arms a segment 55 meshing with the corresponding pinion 46, while the other arm of the member 54 is equipped at its outer end with a roller 56. It will, therefore, be apparent that by raising and lowering the roller-equipped end of the member 54, the shaft 47 and the bracket 49 fixed thereto may be swung around on the vertical axis of the shaft away from the stop 50, and that as soon as the roller arm of the member 54 is released the bracket 49, under the influence of the torsion spring 51, will swing around again against its stop. A short horizontal shaft 57 is journaled in each bracket 49 at 58 and has at its upper end a screw-threaded reduced portion 59 on which is adapted to be screwed the knob or mount 60 to be burnished or polished. The inner end of each of these free knob shafts 57 is supplied with a beveled pinion 61, while a collar 62 at the opposite end of the bearing prevents longitudinal displacement of the knob shaft. I provide also on each bracket 49 a bevel gear 63 meshing with the gear 61 and fixed to the lower end of a vertical shaft 64 having a bearing in the upper portion of the bracket 49 at 65. The top end of each shaft 64 is pinned to a universal coupling 66, which in turn is fastened to a comparatively long small shaft 67.

In order to give the table 20 the required step by step or intermittent partial (90°) rotation necessary to temporarily carry the various knobs or mounts successively into the fields of action of the various rotating buffer wheels, I provide a pinion 68 (Fig. 9) on the inner end of a main driving shaft 69 having a bearing 70 and equipped with a driving pulley 71. The rotation of the shaft 69 is transmitted back to a cam shaft 72 having bearings 73 and 74 on standard 30 and bearing 75 on post or standard 30 by means of the comparatively large gear 76 on the shaft 72 and a pinion 77 on shaft 69. The pinion 68 meshes with a horizontal bevel gear 78 loosely rotatable on a fixed vertical shaft 79 at the rear of the main post or standard 24, the lower end of this shaft being retained in a support 80, while the upper end is maintained in position in an aperture of a boss 81 extended outwardly from a transverse bearing 82 fixed to the post or standard 24 and hereinafter mentioned. Also mounted and loosely rotatable on the shaft 79 below the gear 78 there is provided a plate 83 having on its under surface a roller 84 adapted to coöperate with radial grooves 85, 90° apart, on the top face of a plate 86 fixed to the shaft 22, these parts constituting what is known as a Geneva movement. The periphery of plate 86 is provided with four concavities 87 of the same diameter as and adapted to receive portions of the hub 88 depending from the plate 83 whereby to lock the plate 86 in proper positions 90° apart.

In order to couple or clutch the gear 78 to the plate 83, whereby to cause the intermittent 90° rotation of the plate 86 and shaft 22, I slidingly mount on the stationary shaft 79 a clutch sleeve 89 having a downwardly-extended pin 90 passing through an aperture in the gear 78 and adapted to be projected into an aperture 91 of the roller plate 83. As is obvious, when the sleeve 89 is slid down on the shaft 79 the pin 90 locks together the gear and plate 83 by passing through apertures in both. To actuate and slide this rotary sleeve 89 vertically on the shaft 79, I employ a lever 92 fulcrumed at 93 and having the usual arms straddling the sleeve 89 and supplied with projections entering a circular groove 95 thereon. Since this is a usual and ordinary construction, further description of its details is not deemed necessary. The lever 92 is normally pulled upwardly by a spring 96 and has at its outer end a roller 97 adapted to ride upon the periphery of a cam 98 mounted on and fastened to the cam shaft 72. It should be apparent from this description and operation of the parts that, owing to the rotation of the cam 98, the lever is at times rocked upon its fulcrum 93 so as to raise or lower the sleeve 89 and the pin 90 carried thereby, in so doing clutching the gear 78 to and unclutching it from the roller plate 83, causing the periods of movement and idleness thereof. The hub 88 of the plate 83 has a concave portion or recess 99 (Fig. 9) opposite the roller 84, and during the rotation of the plate 83 and its hub 88, and as the pin or roller 84 enters one of the slots 85, the plate 86 is unlocked and permitted to have rotary movement transmitted thereto by the pin or roller 84, due to the fact that the recess 99 of hub 88 comes to such a position as to cause the unlocking, the external convex surface of the hub normally fitting in one of the concavities 87 of the plate 86 to lock the latter plate from turning. It will, therefore, be readily understood that the plate 86 and shaft 22 are unlocked and turned 90° each time that the cam 98 permits such movement of the parts.

Referring now to the mechanism for rotating the shafts 67 and knobs or mounts 60 on their own axes, it will be noted that the main horizontal driving pulley 100 (Fig. 12) operated by a belt 101 (Fig. 2) is keyed to a sleeve or bushing 102 rotatable on the hollow shaft or post 35, a central friction drive pulley 103 being also keyed to the sleeve or bushing 102 and operated by the belt 101, as is obvious. A spider 104 having four radiating arms is fastened to the upper end of the central hollow shaft 22 by a set-screw 105. At its outer end each arm of the spider is supplied with a vertical bearing 106 in which is mounted and rotatable an eccentric bushing 107, through an aperture 108 of which an upper end of one of the shafts 67 finds a bearing, the top ends of each of these shafts being equipped with a flexible coupling 109 below the spider and above the spider with a friction pulley 110 adapted to bear against and receive its rotation from the central friction drive pulley 103. Each eccentric bushing above its bearing 106 has attached to a laterally-extended crank-arm 107 integral with or fastened to the bushing a link or rod 111, the rear end of each of which passes through an aperture 112 of the adjacent arm of the spider 104, a spring 113 being interposed between such spider arm and a collar 114 fastened to the link 111, whereby the springs act to force the eccentric bushings or bearings around in such a manner as to push or press the drive pulleys 110 against the centrally-disposed common drive pulley 103.

In front of the machine and to the supporting beam 37 I attach a frame 115 on a transverse portion of which is supported a vertical bearing 116 accommodating a vertical shaft 117 supplied at its upper end with a friction drive pulley 118 and at its lower end with a friction cone 119. It will be observed from Figs. 2 and 3 that the drive pulley 118 is in the same plane as the horizontal common friction drive pulley 103, whereby, by mechanism hereinafter explained, the pulleys 110 when they reach the front of the machine may be thrown automatically out of contact with the larger friction pulley 103 into contact with the smaller friction pulley 118. A horizontal shaft 120 is provided at the lower end of the frame 115, the same having bearings 121 and 122, the latter being slidable. Shaft 120 at one end has a drive pulley 123, and between its bearings the shaft is equipped with the oppositely-disposed friction cones 124 and 125, either of which may be shifted into contact with the intermediate cone 119. The bearing 122 is longitudinally slidable in its guiding support 126, and at its front has a pair of apertures 127 adapted to receive a pair of inwardly-extended fingers 128 rigid with a vertical shaft 129 having a bearing at its top end at 130 on the support 37, and at its lower end having a bearing at 131 in the plate or support 132 below the bearing 122. It is obvious, therefore, that by rocking the shaft 129 either of the friction cones 124 and 125 may be shifted into operative contact with the intermediate cone 119. In order that the operator may have foot control of this shaft 129, I fix to the same near its top end a lever 133 both ends of which have cables 134 and 135 secured thereto. The cable or cord 134 passes through an aperture 136 in one of the arms of the frame 36, around a guiding sheave 137, and downwardly through the hollow post 35 and shaft 22, its lower end being fastened to a foot-lever 138 fulcrumed adjacent to the bottom end of shaft 22, having its front end protruding through an aperture in the base of the machine and normally forced upwardly by a spring 139 located in front of the fulcrum. The cable 135 passes around a horizontal guiding sheave 140 (Fig. 11) through an aperture in the support 36 over another guiding sheave 141, its lower end being fastened to a foot-lever 142 fulcrumed at 143 (Fig. 10) and spring-pressed upwardly by a coil spring 144, these two levers 138 and 142 and associated parts being substantially duplicates of one another.

When the operator steps upon one of these levers through the cord attached thereto the lever or arm 133 and the shaft 129 to which it is fastened are shifted or turned, and one or the other of the cones 124 or 125 is brought into operative frictional contact with the cone 119, whereby the friction pulley 118 is rotated in one direction. When the operator or workman steps on the other lever it will be apparent that the pulley 118 is rotated in the opposite direction, because the other one of the companion shiftable cones 124 and 125 will be pressed into contact with the frictional cone 119.

In order to throw the friction pulleys 110 out of contact with the common driving pulley 103 when they reach the front of the machine, that is the portion of the machine equipped with no buffer wheel, and into contact with the other friction pulley 118, I mount on the frame 115 a roller 145 (Fig. 3) adapted to engage the arms 107ᵃ of the eccentric bushings and swing the bushings around in opposition to the actions of the springs 113 so as to move the pulleys 110 away from pulley 103 and into operative engagement with the pulley 118.

When the rotating knobs or mounts are being burnished or polished by the buffer wheels, the slides 38 of the table 20 are pushed outwardly by means described hereinafter in opposition to the inward pull of the springs 40. The means for pushing out these slides when they are opposite the buffer 27 comprises substantially the following parts: A shaft 146 (Figs. 1 and 2) is rotatable in a bearing 147 on a standard 148 bolted to one side of the main front post or standard 24, and to the inner end of this shaft I fasten an arm 149 adapted to bear against the rear side of a roller 150 provided on each of the depending arms or brackets 44. To the other end, that is the forward end, of shaft 146 I securely fasten another arm 151 connected by a link 152 to the end of an arm 153 pulled upwardly by a spring 154 and secured at one end to a shaft 155 passing through a sleeve 156 in a bearing 82 supported on the rear face of the main post or standard 24. The opposite end of shaft 155 has securely fastened thereto an arm 157 supplied at its end with a roller 158 adapted to bear on the periphery of a cam 159 mounted on and rotatable with cam shaft 72. Obviously, as the cam rotates it can readily control the reciprocation of whatever sliding block 38 happens to be opposite the buffer wheel 27.

The means for forcing outwardly the knob slide 38 opposite the rear buffer wheel 28 includes a shaft 160 rotatable in a bearing 161 on the rear of standard 24 above bearing 82, this shaft having fixed to one end an arm 162 intended to bear against and co-act with the roller 150 of the particular slide 38 which happens to be opposite the buffer wheel 28, the arm being pulled inwardly by a coil expansion spring 163. To swing this arm, whereby to cause the proper reciprocation of the slide and the knob supported thereon, I fix to the other end of shaft 160 an arm 164, a roller 165 on the end of which co-acts with the periphery of another cam 166 on the cam shaft 72.

To actuate the table slide opposite the third buffer wheel 29, I provide a bell crank 167 (Figs. 1 and 3) fulcrumed at 168 and spring-pressed by a coil torsion spring 169 encircling the pivot or stud of the bell crank. The upwardly-extended arm of this bell crank coöperates with the roller 150 of the slide opposite buffer wheel 29, while the other end or arm of the bell crank is connected by a link 170 to an arm 171 of a shaft 172 having a pair of bearings 173 and 174, between which there is fastened to the shaft an upwardly-extended arm 175 having at its end a roller coöperating with cam 176 of cam shaft 72. By these three slide-operating mechanisms the inward and outward travel of the slides which carry the mounts or knobs is readily controlled and regulated by the three governing cams mentioned. When the knobs are being polished by the buffer wheels the slides are thrust outwardly by the cams, and when the table is turning so as to advance the knobs to the next buffer wheels, the slides are all drawn inwardly by their retracting springs 40, this action being permitted by the shapes of the cams employed.

In order to swing the bracket 49 and its shaft 47 on the axis of the latter when the bracket is opposite the first buffer wheel 27, I use the following mentioned instrumentalities: To one end of the sleeve 156 which is rotatable in the bearing 82 there is clamped or fixed an arm 177 which operates a suitably-guided vertically-sliding bar 178 (Fig. 1) the upper end of which carries a transverse finger or bar 179 which is adapted to operate the right-angle member 34 and the roller 55 carried at its end. It will be apparent that as this bar 178 and its lug or finger 179 are reciprocated vertically the cam 55 is caused to rock, transmitting such movement to the pinion 46 and bracket 49, thereby bringing the desired portions of the knob or mount in contact with the periphery of the buffer wheel 27. Arm 177, which is shown in Figs. 1 and 8, is normally pulled down by a coil spring 180. To the opposite end of sleeve 156 there is fixed and secured another arm 181 carrying a roller 182 which rides on the surface of another controlling cam 183 on cam shaft 72. Obviously, then, as the cam rocks the arm 181 the cam is shifted and the bracket 49 swung around.

To operate the segment and knob-carrying bracket opposite the back buffer wheel 28, I employ the following parts: A vertical sliding bar 184 carrying at its top end a finger 185 is connected at its lower end to an arm 186 secured to one end of a rock shaft 187 rotatable in suitable bearings 188 and 189, the opposite end of the rock shaft having an upstanding arm 190 pulled inwardly by a spring 191 against the edge of another cam 192 on cam shaft 72. A bell crank fulcrumed at 193 on a suitable stud or in a suitable bearing on the inner surface of the post or standard 30 has an arm 194 adapted to rock the segment and knob bracket when the same are opposite the third buffer wheel 29 by co-action with the roller 56. The depending arm 195 of this bell crank has a roller at its end traveling on the periphery of still another cam 196 on cam shaft 72. The cloth buffer wheel 27 is fastened to a shaft 197 rotatable in a pair of bearings 198 and 199 on a block 200 adjustable toward and from the center of the main table, on the bracket 32, by a screw and operating handle 201 of the usual and ordinary construction, such adjustment being desirable and necessary because of the wearing down of wheel with use. As is well illustrated, the shaft 197 is equipped with a driving pulley 202 rotated by means of a belt, not shown. The buffer wheel 28 is similarly mounted on a shaft 203 having a driving pulley 204 and rotatable in bearings 205 on a block 206 adjustable toward and from the table by a screw and handle 207. The third buffer wheel 29 (Fig. 3) is similarly mounted on a shaft 208 having a driving pulley 209 and rotatable in bearings 210 and 211 on the top of an adjustable block 212, movable toward and from the table on the top of standard or post 30 by a screw and its turning handle 213.

On each of the adjustable sliding blocks or supports carrying one of the buffer wheels, its bearings, shaft, etc., there is suitably mounted an abradant applying mechanism, and since all of these are substantially alike a description of one of them will suffice, such a device being illustrated in detail in Figs. 13 to 17, inclusive.

On a right-angle bracket or support 214 there is placed a guide 215, grooved internally at 216 to accommodate outwardly-extended flanges or guides 217 on the outer faces of the side wheels 218 of a carriage or support for a block or bar of abrading or polishing material 219. Across the top of these side wheels a cover 220 is extended against which the bar of abradant or polishing material is pressed by a pair of right-angle blocks 221 pressed upwardly by coil springs 222. The end of this carriage or support from the buffer wheel, as is shown in Fig. 13, is open and the block of abradant or polishing material projects out of the same toward the wheel, as will be readily understood. Extended longitudinally of this abradant box and between the blocks 221, I provide a screw-threaded rod 223, which has a bearing in a plate 224 closing the outer end of the box, and is prevented from longitudinal shifting in such bearing by suitable collars or other parts, one of the collars being characterized 225. On this screw-threaded rod is a threaded nut 226 adapted to bear against the rear end of the block of abradant or polishing material 219 and fitting between the walls of the carriage or support so as to prevent rotation of the nut. Therefore, as the rod or screw is turned the nut is caused to travel forwardly or rearwardly in accordance with the direction of rotation of the screw, and when thus fed forwardly the block of abradant material is caused to project farther out of the open end of the carriage. A ratchet 227 is fixed to the screw 223 just outside of the end plate 224, and rotatable on the round portion of the screw outside or next to the ratchet I provide a toothed segment 228 having oppositely-extended arms 229 and 230, the former having pivoted thereto at 231 a spring-pressed pawl 232 coöperating with the teeth of the adjacent ratchet 227. The other arm 230 of this segment co-acts with the cam 233 of a bar 234 located in the guide block 215 below the abradant carriage, and having its cam end 233 extended outwardly beyond the end of the carriage.

On the outer side of the abradant carriage and rotatable in bearings 235 and 236, the former of which is an extension of the end plate 224, I supply the device with another screw-threaded rod or shaft 237 carrying a traveling nut 238 which is prevented from rotating by contact with the side of the box, the nut having attached thereto a chain 239 passing downwardly over a sprocket wheel 240 at the inner end of the right-angle support 214. This threaded shaft or rod 237 is likewise equipped with a ratchet wheel 241 fixed thereto outside of the bearing 235, and on the rod or shaft and at the side of this ratchet I provide a toothed segment 242, the teeth of which mesh with the segment 228. Segment 242 has an upwardly-extended arm 243 to which is pivoted a spring-actuated pawl 244 co-acting with the teeth of the ratchet 241. The arm 243 is also connected to a pin secured to the opposite side of the carriage by a contractile spring 245 which is adapted, under normal conditions, to hold the meshing segments in the position shown in Fig. 16.

It is to be understood that as the box or carriage with the block or bar of abradant or polishing material is advanced by a downward pull on the chain 239 so as to apply the abradant or polishing material to the buffer wheel, the arm or finger 230 of the segment 228 is shifted to one side by the cam surface 233, causing the intermeshing segments to rotate in opposite directions on their respective shafts or screws 223 and 237. During this movement of the segments the pawls 232 and 244 by co-action with their ratchets fixed to the screws cause a partial rotation of the screws in opposite directions, thereby advancing the nut or block 226 so as to project or advance the bar or block of abradant 219 a small amount to compensate for the wearing off of the bar of abradant by its successive contacts with the periphery of the buffer wheel. The other nut 238 is retracted slightly by the partial rotation of its screw 237, whereby to modify the travel of the carriage and the abradant bar to make up or compensate for the wearing down of the buffer wheel. In other words, the turning of the screw 237 changes the point of connection of the chain 239 with the carriage which it slides so that the carriage travels slightly farther forwardly on each inward movement.

To draw back or retract the abradant carriage or support, I employ a coil spring 245$^a$ connected at one end to a pin 245$^b$ on the side of the carriage, and at its other end to an outwardly-extended arm 245$^c$ suitably supported on and connected to a guide block 215.

The chain 239 connected to the abradant applying means for the buffer wheel 27 is connected by means of a rod 246 to the front end of an arm or lever 247 (Fig. 2) fulcrumed on the base 25 at 248 and carrying intermediate its ends a roller 249 riding on the cam periphery of a cam 250 on cam shaft 72.

The chain 239$^a$ for the abradant applying mechanism for the buffer wheel 28 (Fig. 4) is connected by a rod 251 to a rock arm 252 having a bearing at 253 and supplied with a roller 254 co-acting with a cam 255 on cam shaft 72.

The actuating chain 239$^b$ for the abradant applying mechanism used in connection with the buffer wheel 29 (Figs. 1 and 4) is connected to the end of a rocker arm 256 fulcrumed on the base of the machine at 257 and having a roller 258 traveling on the edge of still another cam 259 fixed to and rotatable with cam shaft 72.

The operation of this machine is substantially as follows: Assuming that the table 20 carrying the plurality of brackets and knobs supported thereby has just completed one of its 90° partial rotations, the cams, hereinbefore described, act upon the three slides 38 opposite the buffer wheels 27, 28 and 29 to push them outwardly in opposition to their springs 40 so as to bring the knobs 60 against the peripheries of the buffer wheels. These knobs are rotated on their own axes, due to the contact of the three friction pulleys 110 with the central driving pulley 103, the rotation of the smaller pulleys 110 being transmitted, as will be obvious, to the knobs through the flexible shafts 67 and the intermeshing gears 63 and 61. While the knobs are being burnished or polished by the buffer wheels they are also swung laterally or on axes other than their own, that is the axes of the vertical short shafts 47 by the cams described above and the connecting mechanisms. These cams may be so proportioned and shaped as to have the various buffer wheels operate for different periods of time on the different portions of the knobs. For example, owing to the contraction and drawing in of the metal at the base of the knob there is more tendency for inequalities, grooves, and scratches to be present there, and consequently it may be more desirable to have the first buffer wheel 27 act for a much greater time on the neck or shank of the knob than on the head proper. These cams controlling the swinging of the knobs may, of course, be made in any shape desired, and the swinging or turning of the three knobs in front of the three buffer wheels may vary considerably. During such action, however, the knob continually turns on its own axis regardless of its swinging laterally. While these three knobs are being buffed or burnished, the fourth knob at the front of the machine is not only not pushed outwardly, but it neither rotates on its own axis nor swings on a vertical axis except as the rotation of the shaft on which the knob is mounted is controlled by the foot levers 138 and 142. The front knob 60 being stationary because its friction wheel 110 has been thrown out of contact with the friction pulley 103 by the action of roller 145 and into contact with the smaller friction pulley 118, the workman or operator grasps the knob and steps upon one of the controlling levers 138 or 142, which causes the rotation of the threaded end 59 of shaft 57 in such direction as to occasion the unscrewing of the knob therefrom. Obviously, such an action facilitates the removal of this finished polished knob. The operator then applies a new knob to the threaded end 59 of the shaft 57 and steps on the other foot lever 138 or 142, which causes a reverse rotation of this shaft, thereby screwing the knob on to the shaft practically automatically, it merely being necessary for the operator to hold the knob still until it is fully screwed home. After the predetermined period of action of the buffer wheels on the various knobs, the cam 98 through the connections described, including the Geneva movement, causes a 90° rotation of the table and the knobs, the latter and their slides having been previously drawn inward by the springs 40, which action is permitted by the cams controlling the reciprocation of the slides. Such turning of the table advances the knob just screwed on to its shaft by the operator to the first buffer wheel 27, and each of the other knobs is advanced to the next buffer wheel, the finished knob coming to the front of the machine as has been explained before. This finished knob, however, in traveling from the third buffer wheel 29 to the front of the machine ceases its rotation on its own axis, due to the shifting of the pulley 110 on its shaft 67.

The operation of the abradant applying mechanisms has been fully described above, whereby further description is hardly necessary, except to state that the carriages or supports in which the blocks or bars of abradant are mounted may be brought up to their buffer wheels so as to apply the abradant at any time desired, preferably, however, during the interval when the wheels are not acting on the knobs.

It is to be understood that my invention is susceptible of a variety of embodiments varying considerably in the details of their structural features. Consequently, my invention is not limited to the precise and exact parts and members shown and described, since the described embodiment of the same may be modified within wide limits without departure from the heart and essence of my invention. For example, although I have shown and set forth a machine having three buffer wheels in which the table rotates 90° at each actuation, it is perfectly obvious that the number of wheels may be varied as occasion demands, and that the extent of rotation of the knob-carrying table may be modified to agree with the number and disposition of the buffer wheels. Furthermore, all of the wheels need not be supplied with abradant or polishing material applying means since in some cases this material may be pressed upon the peripheries of the wheels by hand, this being especially true in the case of the last or final buffer wheel which acts on the knobs.

Instead of the screw-threaded shafts described above for supporting the knobs, I may employ expanding mandrels, tapered centers, or the like.

I claim:

1. In a machine of the character described, the combination of a plurality of buffers, means to actuate said buffers, a table, means to rotate said table to carry the piece to be buffed successively into the fields of action of said buffers, means to rotate said piece to be buffed on its own axis, and means to swing said piece on an axis other than its own while being operated upon by said buffers, substantially as described.

2. In a machine of the character described, the combination of a plurality of buffers, means to actuate said buffers, a movable table, a plurality of supports on said table each adapted to support a piece to be buffed, means to rotate each of said pieces on its own axis, and means to intermittently move said table to bring said pieces successively into the fields of operation of said buffers, substantially as described.

3. In a machine of the character described, the combination of a plurality of buffers, means to actuate said buffers, a movable table, a plurality of supports swingingly mounted on said table and each adapted to support a piece to be buffed, means to swing said supports, and means to move said table to bring said pieces successively into the fields of operation of said buffers, substantially as described.

4. In a machine of the character described, the combination of a plurality of buffers, means to actuate said buffers, a movable table, a plurality of supports swingingly mounted on said table and each adapted to support a piece to be buffed, means to rotate each of said pieces on its own axis, and means to move said table to bring said pieces successively into the fields of operation of said buffers, substantially as described.

5. In a machine of the character described, the combination of a buffer, means to actuate said buffer, a rotary table, means to intermittently rotate said table, a slide mounted on said table, a support on said slide for the piece to be buffed, and means to reciprocate said slide to advance said piece to the buffer to be operated upon thereby and to retract the same therefrom, substantially as described.

6. In a machine of the character described, the combination of a plurality of buffers adapted to produce different effects on the piece to be buffed, means to actuate said buffers, a rotary table, means to intermittently rotate said table, a slide on said table, a support for a piece to be buffed on said slide, and means to reciprocate said slide to advance the piece to be buffed to and retract it from said buffers, substantially as described.

7. In a machine of the character described, the combination of a plurality of buffers adapted to produce different effects on the pieces to be buffed, means to actuate said buffers, a rotary table, means to intermittently rotate said table, a plurality of slides on said table, a support for a piece to be buffed mounted on each of said slides, and means to reciprocate said slides to advance said pieces to and retract them from said buffers, substantially as described.

8. In a machine of the character described, the combination of a plurality of buffers, means to actuate said buffers, a rotary table, means to intermittently rotate said table, a plurality of slides mounted on said table, a support for a piece to be buffed on each of said slides, means to rotate said pieces on their own axes, and means to reciprocate said slides to advance said pieces to and retract them from said buffers, substantially as described.

9. In a machine of the character described, the combination of a plurality of buffers, means to actuate said buffers, a rotary table, means to intermittently rotate said table, a plurality of slides mounted on said table, a support for a piece to be buffed on each of said slides, means to rotate each of said pieces to be buffed on its own axis, means to swing each of said supports on an axis other than that of the piece to be buffed, and means to reciprocate said slides to advance said pieces to and retract them from said buffers, substantially as described.

10. In a machine of the character described, the combination of a plurality of buffers, means to actuate said buffers, a table, means to rotate said table, a plurality of rotatable shafts on said table to support pieces to be buffed, means to move said shafts to bring said pieces successively into the fields of action of said buffers, a common driving means to rotate said shafts, means to render said driving means temporarily inoperative upon each of said rotatable shafts whereby to permit the substitution of another piece to be buffed for the finished piece, substantially as described.

11. In a machine of the character described, the combination of a plurality of buffers, means to actuate said buffers, a plurality of rotatable screw-threaded shafts adapted to support the screw-threaded pieces to be buffed, means to move said shafts to bring said pieces successively into the fields of action of the buffers, a common driving means to rotate said shafts, means to render said driving means temporarily inoperative upon each of said rotatable shafts whereby to permit the substitution of another piece to be buffed for the finished piece, means to rotate each of said shafts in opposite directions when temporarily not operated upon by said common driving means, and controlling means for said latter rotating means, substantially as described.

12. In a machine of the character described, the combination of a plurality of buffers, means to actuate said buffers, a rotatable table, means to intermittently rotate said table, a plurality of brackets swingingly mounted on said table, screw-threaded shafts on said brackets, the screw-threaded pieces to be buffed being adapted to be screwed on said shafts, a driving shaft connected to and adapted to rotate each of said screw-threaded shafts, means to rotate said driving shafts, means to render said latter rotating means temporarily inoperative upon each of said screw-threaded shafts in opposite directions when not acted upon by said rotating means to facilitate the substitution of pieces to be buffed for the finished pieces, and means to control the action of said shaft-revolving means, substantially as described.

13. In a machine of the character described, the combination of a plurality of buffers, means to actuate said buffers, a rotatable table, means to intermittently rotate said table, a plurality of brackets swingingly mounted on said table, a screw-threaded shaft on each of said brackets, the screw-threaded pieces to be buffed being adapted to be screwed on said shafts, means to swing said brackets, an upright driving shaft connected to and adapted to rotate each of said screw-threaded shafts, a common central friction driving pulley, a friction pulley on each of said driving shafts adapted to bear against said central driving pulley, means to separate each of said pulleys from said central driving pulley when it reaches a definite position, means to revolve each of said pulleys in opposite directions when disconnected from said central driving pulley, and means to control said latter revolving means, substantially as described.

14. In a machine of the character described, the combination of a buffer wheel, means to rotate said buffer wheel, a movable support or carriage for an abradant or polishing material, and automatic means to periodically move said support or carriage to apply the abradant or polishing material to the buffer wheel, substantially as described.

15. In a machine of the character described, the combination of a buffer wheel, means to rotate said buffer wheel, a movable carriage or support for an abradant or polishing material, automatic means to periodically move said carriage or support to apply the abradant or polishing material to said buffer wheel, and automatically acting means to feed said abradant or polishing material forward in its support or carriage to compensate for the wearing off of the same, substantially as described.

16. In a machine of the character described, the combination of a buffer-wheel, means to rotate said buffer wheel, a movable support or carriage for an abradant or polishing material, automatically-acting means connected to said support or carriage and adapted to periodically move the same to apply the abradant or polishing material to the buffer wheel, and automatically-acting means to vary the point of connection of said carriage-moving means to said carriage to compensate for wearing down of said buffer wheel, substantially as described.

17. In a machine of the character described, the combination of a buffer wheel, means to rotate said buffer wheel, a movable support or carriage for an abradant or polishing material, automatically-acting means connected to said support or carriage and adapted to periodically move the same to apply the abradant or polishing material to the buffer wheel, and automatically-acting means to vary the travel of said support or carriage whereby to compensate for wearing down of said buffer wheel, substantially as described.

18. In a machine of the character described, the combination of a buffer wheel, means to rotate said buffer wheel, a movable carriage or support for an abradant or polishing material, automatically-acting means to periodically move said support or carriage to apply the abradant or polishing material to said buffer wheel, automatically-acting means to feed said abradant forward in its support or carriage to compensate for the wearing off of the abradant or polishing material, and automatically-acting means to vary the travel of said support or carriage to compensate for wearing down of said buffer wheel, substantially as described.

19. In a machine of the character described, the combination of a buffer wheel, means to rotate said buffer wheel, a movable support or carriage for an abradant or polishing material, automatically-acting means to periodically move said support or carriage to apply the abradant or polishing material to said buffer wheel, a screw to feed said abradant forward in its support or carriage to compensate for the wearing off of the abradant or polishing material, and means to rotate said screw step by step, substantially as described.

20. In a machine of the character described, the combination of a buffer wheel, means to rotate said buffer wheel, a movable support or carriage for an abradant or polishing material, automatically-acting means connected to said support or carriage and adapted to periodically move the same to apply the abradant or polishing material to the buffer wheel, a screw to vary the point of connection of said carriage-moving means to said carriage to compensate for wearing down of said buffer wheel, and means to automatically turn said screw step by step, substantially as described.

21. In a machine of the character described, the combination of a buffer wheel, means to rotate said buffer wheel, a movable carriage or support for an abradant or polishing material, a cam, a connection between said cam and carriage or support including a screw, said cam and connection being adapted to periodically advance said carriage or support and apply the abradant or polishing material to the buffer wheel, a spring to retract said carriage or support, and means to turn said screw during the movement of said carriage or support to vary the travel of the latter and thereby compensate for the wearing down of the buffer wheel, substantially as described.

22. In a machine of the character described, the combination of a buffer wheel, means to rotate said buffer wheel, a movable carriage or support for an abradant or polishing material, a cam, a connection between said cam and carriage or support, said cam and connection being adapted to periodically advance said carriage or support and apply the abradant or polishing material to the buffer wheel, means to retract said carriage or support, a rotatable screw to feed said abradant or polishing material forwardly in its carriage or support to compensate for the wearing off of the same, and means to turn said screw during movement of said carriage, substantially as described.

23. In a machine of the character described, the combination of a buffer wheel, means to rotate said buffer wheel, a movable carriage or support for an abradant or polishing material, means to advance said carriage or support toward said buffer wheel to periodically apply said abradant or polishing material thereto, a connection between said advancing means and said carriage or support including a screw, a second screw to feed the abradant or polishing material forwardly in its support or carriage to compensate for the wearing off of the same, a pair of intermeshing gears, a pawl and ratchet connection between one of said gears and said first mentioned screw, a second pawl and ratchet connection between the other gear and said second screw, a spring to turn said gears in one direction, an arm rigid with one of said gears, and a stationary cam with which said arm coöperates to turn said gears and screws whereby to feed the abradant or polishing material forwardly in its carriage or support and change the travel of said carriage or support to compensate for the wearing down of the buffer wheel, substantially as described.

JOHN F. GAIL.

Witnesses:
WALTER M. FULLER,
CLARE L. ROSENOW.